(12) United States Patent
Snoek et al.

(10) Patent No.: US 8,990,134 B1
(45) Date of Patent: Mar. 24, 2015

(54) LEARNING TO GEOLOCATE VIDEOS

(75) Inventors: Jasper Snoek, Zurich (CH); Luciano Sbaiz, Zurich (CH); Hrishikesh Aradhye, Santa Clara, CA (US); George Toderici, Mountain View, CA (US)

(73) Assignee: Google Inc., Mountain View, CA (US)

( * ) Notice: Subject to any disclaimer, the term of this patent is extended or adjusted under 35 U.S.C. 154(b) by 599 days.

(21) Appl. No.: 12/881,078

(22) Filed: Sep. 13, 2010

(51) Int. Cl.
  *G06K 9/62* (2006.01)

(52) U.S. Cl.
  USPC .......................................................... 706/45

(58) Field of Classification Search
  None
  See application file for complete search history.

(56) References Cited

U.S. PATENT DOCUMENTS

| | | | |
|---|---|---|---|
| 6,006,257 A | 12/1999 | Slezak | |
| 6,774,917 B1* | 8/2004 | Foote et al. | 715/700 |
| 7,107,520 B2 | 9/2006 | Gargi | |
| 7,620,551 B2 | 11/2009 | Ho | |
| 8,472,662 B2 | 6/2013 | Muriello et al. | |
| 2004/0203851 A1* | 10/2004 | Vetro et al. | 455/456.1 |
| 2004/0205482 A1* | 10/2004 | Basu et al. | 715/500.1 |
| 2004/0215663 A1 | 10/2004 | Liu et al. | |
| 2007/0053513 A1 | 3/2007 | Hoffberg | |
| 2008/0002892 A1 | 1/2008 | Jelonek et al. | |
| 2008/0144943 A1 | 6/2008 | Gokturk et al. | |
| 2008/0307311 A1* | 12/2008 | Eyal | 715/733 |
| 2009/0132355 A1 | 5/2009 | Begeja et al. | |
| 2009/0208106 A1* | 8/2009 | Dunlop et al. | 382/173 |
| 2009/0292685 A1 | 11/2009 | Liu et al. | |
| 2010/0161385 A1 | 6/2010 | Karypis et al. | |
| 2010/0180218 A1* | 7/2010 | Boston et al. | 715/759 |
| 2010/0333125 A1 | 12/2010 | Eldering et al. | |
| 2011/0018998 A1* | 1/2011 | Guzik | 348/143 |
| 2011/0030031 A1* | 2/2011 | Lussier et al. | 726/1 |
| 2011/0072114 A1* | 3/2011 | Hoffert et al. | 709/219 |
| 2012/0102033 A1* | 4/2012 | Sarshar et al. | 707/737 |

OTHER PUBLICATIONS

Brodley C., Friedl M., "Identifying and Eliminating Mislabeled Training Instances" in AAAI/IAAAI (1996) pp. 799-805.*
Cao, L., et al., "Annotating Photo Collections by Label Propagation According to Multiple Similarity Cues," Proceeding of the 16th ACM international conference on Multimedia, 2008, 9 pages.

(Continued)

*Primary Examiner* — Kakali Chaki
*Assistant Examiner* — Michael Zidanic
(74) *Attorney, Agent, or Firm* — Fenwick & West LLP

(57) ABSTRACT

A classifier training system trains classifiers for inferring the geographic locations of videos. A number of classifiers are provided, where each classifier corresponds to a particular location and is trained from a training set of videos that have been labeled as representing the location. In one embodiment, the training set is further restricted to those videos in which a landmark matching the location label is detected. The classifier training system extracts, from each of these videos, features that characterize the video, such as audiovisual features, text features, address features, landmark features, and category features. Based on these features, the classifier training system trains a location classifier for the corresponding location.

Each of the location classifiers can be applied to videos without associated location labels to predict whether, or how strongly, the video represents the corresponding location. The prediction can be used for a variety of purposes, such as automatic labeling of videos with locations, presentation of location-specific advertisements in association with videos, and display of video data on relevant portions of an electronic map.

20 Claims, 3 Drawing Sheets

(56) References Cited

OTHER PUBLICATIONS

Carvalho, R., "Metadata goes where Metadata is: contextual networks in the photographic domain," ESWC 2008 Ph. D. Symposium, 2008, 5 pages.
Chang, S., et al., "Recent Advances and Challenges of Semantic Image/Video," IEEE International Conference on Acoustics, Speech and Signal Processing, 2007, 4 pages.
Rodriguez, M., et al., "Automatic Metadata Generation Using Associative Networks," ACM Transactions on Information Systems, Feb. 2009, pp. 7:1-7:20, vol. 27, No. 2, Article 7.
Agarwal, N., et al., "Blocking Objectionable Web Content by Leveraging Multiple Information Sources," SIGKDD Explor. Newsl., 2006, vol. 8, No. 1, pp. 17-26.
Ayad, H.G., et al., Cumulative Voting Consensus Method for Partitions with Variable Number of Clusters, IEEE Transactions on Pattern Analysis and Machine Intelligence, Jan. 2008, vol. 30, No. 1, pp. 160-173.
Ayad, H.G., et al., "On Voting-Based Consensus of Cluster Ensembles," Pattern Recognition, May 2010, vol. 43, No. 5, pp. 1943-1953.
Baluja, S., et al., "Video Suggestion and Discovery for YouTube: Taking Random Walks Through the View Graph," Proceedings of the International World Wide Web Conference, 2008, 10 pages.
Barnard, K., et al., "Matching Words and Pictures," Journal of Machine Learning Research, 2003, vol. 3, pp. 1107-1135.
Belkin, M., et al., "Manifold Regularization: A Geometric Framework for Learning from Labeled and Unlabeled Examples," Journal of Machine Learning Research, 2006, vol. 7, pp. 2399-2434.
Blei, D., et al., "Modeling Annotated Data," Proc. ACM SIGIR, 2003, pp. 127-134.
Blum, A., et al., "Combining Labeled and Unlabeled Data with Co-Training," COLT: Proceedings of the Workshop on Computational Learning Theory, Morgan Kaufmann Publishers, 1998.
Boureau, Y.L., et al., "Learning Mid-Level Features for Recognition," Conference on Computer Vision and Pattern Recognition, 2010, pp. 2559-2566.
Brubaker, S. C., et al., "On the Design of Cascades of Boosted Ensembles for Face Detection," International Journal of Computer Vision (IJCV), May 2008, vol. 77, No. 1-3, pp. 65-86.
Brubaker, S. C., et al., "Towards Optimal Training of Cascaded Detectors," Computer Vision—ECCV, Lecture Notes in Computer Science, 2006, vol. 3951/2006, pp. 325-337.
Brubaker, S. C., et al., "Towards the Optimal Training of Cascades of Boosted Ensembles," Toward Category-Level Object Recognition (CLOR), Lecture Notes in Computer Science, 2006, vol. 4170/2006, pp. 301-320.
Cao, X., et al., "Video Shot Motion Characterization Based on Hierarchical Overlapped Growing Neural Gas Networks," Multimedia Systems, Springer-Verlag 2003, School of Electrical and Electronic Engineering, Nanyang Technological University, Nanyang Avenue, Singapore, 639798, pp. 1-8.
Chang, C.-C., et al., "Liblinear: a Library for Large Linear Classification," 2010, [online] [Retrieved on Jan. 17, 2011], Software available at <http://www.csie.ntu.edu.tw/~cjlin/liblinear/>.
Chang, E., et al., "A Unified Learning Paradigm for Large-Scale Personalized Information Management," Proceedings of the Emerging Information Technology Conference, 2005.
Chou, Y.Y., et al., "A Hierarchical Multiple Classifier Learning Algorithm," Proceedings of the 15$^{th}$ International Conference on Pattern Recognition—ICPR 2000, vol. II, pp. 152-155.
Christoudias, C. M., et al., Co-Training with Noisy Perceptual Observations, CVPR, 2009, pp. 1-10.
Cilibrasi, R. L., et al., "A Fast Quartet Tree Heuristic for Hierarchical Clustering," Pattern Recognition, Mar. 2011, vol. 44, No. 3, pp. 662-677.
Concepción Morales, E.R., et al., "Building and Assessing a Constrained Clustering Hierarchical Algorithm," Proceedings of the 13$^{th}$ Iberoamerican Congress on Pattern Recognition, CIARP 2008, Sep. 9-12, 2008, pp. 211-218.
Cordella, L. P., et al., "Combining Single Class Features for Improving Performance of a Two Stage Classifier," Proceedings of the 2010 International Conference on Pattern Recognition, Aug. 23-26, 2010, pp. 4352-4355.
Cour, T., et al., "Learning from Ambiguously Labeled Images," Technical Report, U. Penn., 2009, pp. 1-8.
Day, M., et al., "Constructing Efficient Cascade Classifiers for Object Detection," Proceedings of 2010 IEEE 17$^{th}$ International Conference on Image Processing, Hong Kong, Sep. 26-29, 2010, pp. 3781-3784.
Dekel, O., et al., "Large Margin Hierarchical Classification," ICML, 2004, 8 pages.
Deng, J., et al., "ImageNet: A Large-Scale Hierarchical Image Database," *CVPR09*, 2009, 8 pages.
Duan, L., et al., "Domain Transfer SVM for Video Concept Detection," Proceedings of IEEE Conference on Computer Vision and Pattern Recognition (CVPR), 2009, pp. 1375-1381.
Duchenne, O., et al., "Automatic Annotation of Human Actions in Video," ICCV, 2009, 8 pages.
Dundar, M. M., et al., "Joint Optimization of Cascaded Classifiers for Computer Aided Detection," CVPR07, pp. 1-8.
Duygulu, P., et al., "Object Recognition as Machine Translation: Learning a Lexicon for a XED Image Vocabulary," Computer Vision—ECCV 2002, Proceedings of the 7$^{th}$ European Conference on Computer Vision, Copenhagen, Denmark, May 28-31, 2002, Part IV, pp. 97-112.
El-Sherif, E., et al., "Automatic Generation of Optimum Classification Cascades," International Conference on Pattern Recognition (ICPR), 2008, pp. 1-4.
El-Shishini, H., et al., "A Multistage Algorithm for Fast Classification of Patterns," Pattern Recognition Letters, Oct. 1989, vol. 10, No. 4, pp. 211-215.
Everingham, M., et al., "Hello! My Name is . . . Buffy—Automatic Naming of Characters in TV Video," BMVC, 2006, 10 pages.
Ewerth, R., et al., "Semi-Supervised Learning for Semantic Video Retrieval," Proceedings of the Conference on Image and Video Retrieval (CIVR), Amsterdam, The Netherlands, Jul. 9-11, 2007, pp. 154-161.
Fan, J., et al., "Incorporating Concept Ontology for Hierarchical Video Classification, Annotation, and Visualization," IEEE Transactions on Multimedia, Aug. 2007, vol. 9, No. 5, pp. 939-957.
Fan, R.-E., et al., "Liblinear: A library for large linear classification," Journal of Machine Learning Research, 2008, vol. 9, pp. 1871-1874.
Feng, H., et al., "A Bootstrapping Framework for Annotating and Retrieving WWW Images," Proc. ACM MM, 2004, 8 pages.
Feng, S. L., et al., "Multiple Bernoulli Relevance Models for Image and Video Annotation," Proc. CVPR, 2004, pp. 1-8.
Fergus, R., et al., "A Visual Category Filter for Google Images," ECCV, 2004.
Fergus, R., et al., "Learning Object Categories from Google's Image Search," Proceedings of the 10$^{th}$ IEEE International Conference on Computer Vision (ICCV), 2005, vol. 2, pp. 1816-1823.
Foo, B., et al., "A Distributed Approach for Optimizing Cascaded Classifier Topologies in Real-Time Stream Mining Systems," IEEE Transactions on Image Processing, Nov. 2010, vol. 19, No. 11, pp. 3035-3048.
Freund, Y., et al., "A Decision-Theoretic Generalization of On-Line Learning and an Application to Boosting," Journal of Computer and System Sciences, Aug. 1997, vol. 55, No. 1, pp. 119-139.
Freund, Y., et al., "A Decision-Theoretic Generalization of On-Line Learning and an Application to Boosting," Proceedings of European Conference on Computational Learning Theory (ECCV), Barcelona, Spain, Mar. 13-15, 1995, pp. 23-37.
Giusti, N., et al., "Theoretical and Experimental Analysis of a Two-Stage System for Classification," IEEE Transactions on Pattern Analysis and Machine Intelligence (PAMI), Jul. 2002, vol. 24, No. 7, pp. 893-904.
Gupta, S., et al., "Watch, Listen & Learn: Co-Training on Captioned Images and Videos," Proceedings of the European Conference on Machine Learning and Principles and Practice of Knowledge Discovery in Databases (ECML), 2008, 16 pages.
Hays, J., et al., "IM2GPS: Estimating Geographic Information from a Single Image," Proceedings of the IEEE Conference on Computer Vision and Pattern Recognition (CVPR), 2008.

(56) References Cited

OTHER PUBLICATIONS

Heiseleyz, B., et al., "Feature Reduction and Hierarchy of Classifiers for Fast Object Detection in Video Images," Proceedings of the 2001 IEEE Computer Society Conference on Computer Vision and Pattern Recognition (CVPR01), Kauai, Hawaii, Dec. 8-14, 2001, vol. II, pp. 18-24.
Hore, P., et al., "A Scalable Framework for Cluster Ensembles," Pattern Recognition, May 2009, vol. 42, No. 5, pp. 676-688.
Ikizler-Cinbis, N., et al., "Learning Actions from the Web," Proceedings of 12$^{th}$ International Conference on Computer Vision (ICCV), 2009, 8 pages.
Jones, M. J., et al., "Statistical Color Models with Application to Skin Detection," International Journal of Computer Vision (IJCV), Jan. 2002, vol. 46, No. 1, pp. 81-96.
Jordan, M.I., et al., "Hierarchical Mixture of Experts and the EM Algorithm," Neural Computation, 1994, vol. 6, pp. 181-214.
Kalogerakis, E., et al., "Image Sequence Geolocation with Human Travel Priors," Proceedings of the IEEE International Conference on Computer Vision (ICCV'09), 2009, 8 pages.
Kavukcuoglu, K., et al., "Learning Invariant Features Through Topographic Filter Maps," CVPR09, pp. 1605-1612.
Kukenys, I., et al., "Classifier Cascades for Support Vector Machines," 2008 23$^{rd}$ International Conference Image and Vision Computing New Zealand (IVCNZ08), Nov. 26-28, 2008, pp. 1-6.
Kumar, S., et al., "Discriminative Fields for Modeling Spatial Dependencies in Natural Images," Advances in Neural Information Processing Systems (NIPS), 2004, 8 pages.
Lafferty, J., et al., "Conditional Random Fields: Probabilistic Models for Segmenting and Labeling Sequence Data," Proceedings of International Conference on Machine Learning (ICML), 2001, 8 pages.
Laptev, I., et al., "Learning Realistic Human Actions from Movies," Proceedings of the IEEE Conference on Computer Vision and Pattern Recognition (CVPR), 2008, 8 pages.
Leung, T., et al., "Representing and Recognizing the Visual Appearance of Materials Using Three-Dimensional Textons," International Journal of Computer Vision (IJCV), 2001, vol. 43, No. 1, pp. 29-44.
Li, L., et al., "Optimol: Automatic Online Picture Collection Via Incremental Model Learning," Proc. Computer Vision and Pattern Recognition (CVPR), 2007.
Li, Y., et al., "Bagging Based Efficient Kernel Fisher Discriminant Analysis for Face Recognition," The 18$^{th}$ International Conference on Pattern Recognition (ICPR06), vol. 3, pp. 523-526.
Liu, J., "Recognizing Realistic Actions from Videos "in the Wild"," Computer Vision and Pattern Recognition (CVPR), 2009, 1996-2003.
Liu, T.-Y., et al., "Support Vector Machines Classification with a Very Large-Scale Taxonomy," SIGKDD Explorations, 2005, vol. 1, pp. 36-43.
Lopez-Maury, L., "A Two-Component Signal Transduction System Involved in Nickel Sensing in the Cyanobacterium Synechocystis sp. PCC 6803," Molecular Microbiology, 2002, vol. 43, No. 1, pp. 247-256.
Lowe, D. G., "Distinctive Image Features from Scale-Invariant Keypoints," International Journal of Computer Vision (IJCV), 2004, vol. 60, No. 2, pp. 91-110.
Luo, H., "Optimization Design of Cascaded Classifiers," CVPRO5, vol. 1, pp. 480-485.
Ma, B. P., et al., "Discriminant Analysis for Perceptionally Comparable Classes," FG08, pp. 1-6.
Mangai, U. G., et al., "A Hierarchical Multi-Classifier Framework for Landform Segmentation Using Multi-Spectral Satellite Images—A Case Study Over the Indian Subcontinent," 2010 Fourth Pacific-Rim Symposium on Image and Video Technology, (PSIVT10), Nov. 14-17, 2010, Singapore, pp. 306-313.
Mirzaei, A., et al., "Combining Hierarchical Clusterings Using Min-Transitive Closure," ICPR08, pp. 1-4.
Montagnuuolo, M., et al., "Parallel Neural Networks for Multimodal Video Genre Classification," Multimedia Tools and Applications, Jan. 2009, vol. 41, pp. 125-159.
Nam, M. Y., et al., "Cascade of Fusion for Adaptive Classifier Combination Using Context-Awareness," AMDO06, pp. 252-261.
Neapolitan, R. E., "Learning Bayesian Networks," Prentice Hall, Upper Saddle River, NJ, USA, 2003.
Neven, H., et al., "Image Recognition with an Adiabatic Quantum Computer I. Mapping to Quadratic Unconstrained Binary Optimization," 2008, pp. 107.
Nister, D., et al., "Scalable Recognition with a Vocabulary Tree," CVPR '06: Proceedings of the 2006 IEEE Computer Society Conference on Computer Vision and Pattern Recognition, IEEE Computer Society, Washington, DC, USA, Jun. 2006, vol. 2, pp. 2161-2168.
"OpenDirectoryProject," 1998-2010, [online] [Retrieved on Jan. 16, 2011] Retrieved from the internet <URL:http://www.dmoz.org/>.
Patterson, R. D., et al., "Complex Sounds and Auditory Images," Proc. Auditory Physiology and Perception, 1992, pp. 429-446.
Qi, G.-J., et al., "Correlative Multilabel Video Annotation with Temporal Kernels," ACM Transactions on Multimedia Computing, Communications, and Applications, 2008, vol. 5, No. 1, Article 3, pp. 1-27.
Quost, B., et al., "Pairwise Classifier Combination Using Belief Functions," Pattern Recognition Letters (PRL), Apr. 1, 2007, vol. 28, No. 5, pp. 644-653.
Raina, R., et al., "Self-Taught Learning: Transfer Learning from Unlabeled Data," Proceeding of International Conference on Machine Learning (ICML), Corvallis, OR, 2007, pp. 759-166.
Ramachandran, C., et al., "VideoMule: A Consensus Learning Approach to Multi-Label Classification from Noisy User-Generated Videos," ACM Multimedia, 2009, 4 pages.
Ranzato, M., et al., "Modeling Pixel Means and Covariances using Factorized Third-Order Boltzmann Machines," Proceedings of the IEEE Conference on Computer Vision and Pattern Recognition (CVPR10), 2010, pp. 2551-2558.
Ranzato, M., et al., "Unsupervised Learning of Invariant Feature Hierarchies with Applications to Object Recognition," CVPR07, pp. 1-8.
Rehn, M., et al., "Sound Ranking Using Auditory Sparse-Code Representations," Proc. ICML: Workshop on Sparse Methods for Music Audio, 2009, 3 pages.
Rodriguez, J. J., "Forests of Nested Dichotomies," Pattern Recognition Letters (PRL), Jan. 15, 2010, vol. 31, No. 2, pp. 125-132.
Sargin, E. M., et al., "Audiovisual Celebrity Recognition in Unconstrained Web Videos," Proc. ICASSP, 2009, 4 pages.
Schapire, R. E., "The Boosting Approach to Machine Learning: An Overview," MSRI Workshop on Nonlinear Estimation and Classification, 2002, pp. 1-23.
Schapire, R. E., et al., "Boosting the Margin: A New Explanation for the Effectiveness of Voting Methods," The Annals of Statistics, 1998, vol. 26, No. 5, pp. 1651-1686.
Schindler, G., et al., "Internet Video Category Recognition," First IEEE Workshop on Internet Vision, CVPR, 2008, 7 pages.
Serdyukov, P., et al., "Placing Flickr Photos on a Map," SIGIR'09: Proceedings of the 32$^{nd}$ International ACM SIGIR Conference on Research and Development in Information Retrieval, 2009, New York, NY, USA, pp. 484-491.
Singh, R., et al., "Reduced-Complexity Delayed-Decision Algorithm for Context-Based Image Processing Systems," IEEE Transaction on Image Processing, Aug. 2007, vol. 16, No. 8, pp. 1937-1945.
Slonim, N., et al., "Discriminative Feature Selection via Multiclass Variable Memory Markov Model," Proceedings of the Nineteenth International Conference on Machine Learning, 2002, 8 pages.
Smeaton, A. F., et al., "Evaluation Campaigns and TRECVid," Proceedings of the 8$^{th}$ ACM International Workshop on Multimedia Information Retrieval, ACM Press, Oct. 26-27, 2006, pp. 321-330.
Snoek, C., et al., "The MediaMill TRECVID 2008 Semantic Video Search Engine," 2009, 14 pages.
Snoek, C. G.M., et al., "Early Versus Late Fusion in Semantic Video Analysis," ACM Multimedia 2005, Nov. 6-11, 2005, Singapore, 4 pages.
Song, Y., et al., "Taxonomic Classification for Web-Based Videos," Conference on Computer Vision and Pattern Recognition (CVPR), 2010.

(56) References Cited

OTHER PUBLICATIONS

Su, Y., et al., "Hierarchical Ensemble of Global and Local Classifiers for Face Recognition," IP, Aug. 2009, vol. 18, No. 8, pp. 1885-1896.
Sun, A., et al., Hierarchical Text Classification and Evaluation, Proceedings of the 2001 IEEE International Conference on Data Mining (ICDM), Nov. 2001, pp. 521-528.
Sun F., et al., "Two-Stage Computational Cost Reduction Algorithm Based on Mahalanobis Distance Approximations," ICPR00, vol. II, pp. 696-699.
Szczot, M., et al., "Package Boosting for Readaption of Cascaded Classifiers," 2010 International Conference on Pattern Recognition (ICPR10), pp. 552-555.
Tola, E., et al., "A Fast Local Descriptor for Dense Matching," Proceedings of IEEE Conference on Computer Vision and Pattern Recognition (CVPR), 2008, Alaska, USA, pp. 1-15.
Van Laere, O., et al., "Towards Automated Georeferencing of Flickr Photos," GIR'10: Proceedings of the $6^{th}$ Workshop on Geographic Information Retrieval, Feb. 18-19, 2010, pp. 1-7.
Viola, P., et al., "Rapid Object Detection Using a Boosted Cascade of Simple Features," Proceedings of IEEE Computer Society Conference on Computer Vision and Pattern Recognition (CVPR), 2001, vol. 1, pp. 511-518.
Visentini, I., et al., "Cascaded Online Boosting," Journal of Real-Time Image Processing, Dec. 2010, vol. 5, No. 4, pp. 245-257.
Visentini, I, et al., "On-Line Boosted Cascade for Object Detection," ICPR08, pp. 1-4.
Vuurpijl, L., et al., "An Overview and Comparison of Voting Methods for Pattern Recognition," Proceedings of the Eighth International Workshop on Frontiers in Handwriting Recognition (IWFHR02), 2002, pp. 195-200.
Vuurpijl, L., et al., "Architectures for Detecting and Solving Conflicts: Two-Stage Classification and Support Vector Classifiers," International Journal on Document Analysis and Recognition (IJDAR), Jul. 2003, vol. 5, No. 4, pp. 213-223.
Wang, P., et al., "Training a Multi-Exit Cascade with Linear Asymmetric Classification for Efficient Object Detection," Proceedings of 2010 IEEE $17^{th}$ International Conference on Image Processing (ICIP10), Hong Kong, Sep. 26-29, 2010, pp. 61-64.
Wu, D., et al., "A Min-Max Framework of Cascaded Classifier with Multiple Instance Learning for Computer Aided Diagnosis," Proceedings of IEEE Computer Society Conference on Computer Vision and Pattern Recognition (CVPR09), 2009, pp. 1359-1366.
Wu D., et al., "Resilient Subclass Discriminant Analysis," ICCV09, pp. 389-396.
Wu, J. X., et al., "Fast Asymmetric Learning for Cascade Face Detection," IEEE Transactions on Pattern Analysis and Machine Intelligence (PAMI), Mar. 2008, vol. 30, No. 3, pp. 369-382.
Wu, X., et al., "Incorporating Prior Knowledge with Weighted Margin Support Vector Machines," Proceedings of the International Conference on Knowledge Discovery and Data Mining (SIGKDD), 2004, pp. 326-333.
Yagnik, J., et al., "Learning People Annotation from the Web Via Consistency Learning," Proc. Workshop on MIR, Augsburg, Bavaria, Germany, Sep. 28-29, 2007, pp. 285-290.
Yan, S.Y., et al., "Matrix-Structural Learning (MSL) of Cascaded Classifier from Enormous Training Set," Computer Vision and Pattern Recognition (CVPR07), 2007, pp. 1-7.
Yanai, K., et al., "Probabilistic Web Image Gathering," Proc. ACM SIGMM Workshop on MIR, 2005, pp. 57-64.
Yang, J., et al., "Cross-Domain Video Concept Detection Using Adaptive SVMS," Proceedings of the $15^{th}$ International Conference on Multimedia, Sep. 2007, Augsburg, Bavaria, Germany, 10 pages.
Yang, L., et al., "Multi-Modality Web Video Categorization," Proc. MIR, 2007, ACM Press, pp. 265-274.
"YouTube—Broadcast Yourself," 2011, [online] [Retrieved on Jan. 16, 2011] Retrieved from the internet <URL:http://www.youtube.com>.
Zanetti, S., et al., "A Walk Through the Web's Video Clips," First IEEE Workshop on Internet Vision, Computer Vision and Pattern Recognition (CVPR08), 2008, 8 pages.
Zhang, B.C., et al., "Discriminant Analysis Based on Kernelized Decision Boundary for Face Recognition," AVBPA05, LNCS 3546, 2005, pp. 966.
Zhang, H., et al., "Automatic Partitioning of Full-Motion Video," Multimedia Systems, 1993, vol. 1, No. 1, pp. 10-28.
Zhang, X.Q., "Clustering by Evidence Accumulation on Affinity Propagation," ICPR08, 2008, pp. 1-4.
Zhao, M., et al., "Large Scale Learning and Recognition of Faces in Web Videos," Proceedings of the $8^{th}$ IEEE International Conference on Automatic Face and Gesture Recognition, 2008, 7 pages.
Zhao, R., et al., "Narrowing the Semantic Gap—Improved Text-Based Web Document Retrieval Using Visual Features," IEEE Transactions on Multimedia, Jun. 2002, vol. 4, No. 2, pp. 189-200.
Zheng, Y.-T., et. al, "Tour the World: Building a Web-Scale Landmark Recognition Engine", Proceedings of the International Conference on Computer Vision and Pattern Recognition, Jun. 2009, Miami, Florida, U.S.A., pp. 1-8.
Zhu, X., et al., "Learning from Labeled and Unlabeled Data with Label Propagation," CMU CALD Tech Report CMU-CALD-02-107, 19 pages.
Zhu, X., "Semi-Supervised Learning Literature Survey," Computer Sciences Technical Report 1530, University of Wisconsin-Madison, 2005, pp. 1-38.
Anderson, R., A local algorithm for finding dense subgraphs, In Proc. 19th Annual ACM-SIAM Symposium on Discrete Algorithms, 2008, pp. 1003-1009.
Davison, B. D., "Topical locality in the web," In Proc. 23rd Annual International ACM SIGIR Conference on Research and Development in Information Retrieval, 2004, pp. 272-279.
Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.
Goldman, S., et al., "Enhancing supervised learning with unlabeled data," In Proc. $17^{th}$ International Conference on Machine Learning, 2000, pp. 327-334.
Guillaumin, M., et al., "Multimodal semi-supervised learning for image classification," In Proc. IEEE Conf. Computer Vision and Pattern Recognition, Jun. 2010, pp. 902-909.
Halevy, A., et al., "The unreasonable effectiveness of data," Intelligent Systems, IEEE, Mar. 2009, pp. 8-12, vol. 24, No. 2.
Huang, J., et al., "Exploring web scale language models for search query processing," In Proc. 19th international conference on World wide web, Apr. 26-30, 2010, pp. 451-460.
Koller, D., et al., "Hierarchically classifying documents using very few words," In the Proceedings of the Fourteenth International Conference on Machine Learning, ICML, Jul. 8-12, 1997, pp. 170-178.
Li, L.-J., et al., "Towards total scene understanding: Classification, annotation and segmentation in an automatic framework," In Proc. IEEE Conf. Computer Vision and Pattern Recognition, 2009, pp. 2036-2043.
Mahajan, D., et al., "Image classification using the web graph," In Proc. Multimedia, Oct. 25-29, 2010, pp. 991-994.
Niebles, J. C., et al., "Extracting moving people from internet videos," In ECCV '08: Proceedings of the 10th European Conference on Computer Vision, 2008, pp. 527-540, Part IV, LNCS 5305.
Tang, L., et al., "Large scale multi-label classification via metalabeler," In Proc. $18^{th}$ International Conference on World Wide Web, Apr. 20-24, 2009, pp. 211-220.
Wang, Z., et al., "Youtubecat: Learning to categorize wild web videos," In Proc. IEEE Conf. Computer Vision and Pattern Recognition, Jun. 2010, pp. 879-886.
Zhu, X., Semi-supervised learning literature survey. In Tech Report. University of Wisconsin—Madison, Jul. 2008, pp. 1-60.
Mei, T., et al., "VideoSense-Towards Effective Online Video Advertising," Proceedings of the $15^{th}$ International Conference on Multimedia, Sep. 23, 2007, pp. 1075-1084.
European Search Report for European Patent Application No. EP 09839466.1, Apr. 5, 2013, 9 Pages.
Remias, E., "Block-Oriented Image Decomposition and Retrieval in Image Database System," Multimedia Database Management Systems, Proceedings of International Workshop on DOI, 1996, pp. 85-92.

* cited by examiner

LEARNING TO GEOLOCATE VIDEOS

BACKGROUND

1. Field of Art

The present invention generally relates to the field of digital video, and more specifically, to methods of training accurate classifiers for inferring a location depicted in a video.

2. Background of the Invention

Video hosting services, such as YOUTUBE™, have become an increasingly popular way of sharing and viewing digital videos, with users contributing tens of millions of videos each year. Accurate labeling of a video is of great value in such systems, permitting users to search for videos corresponding to given labels, and the video hosting service to more accurately match videos with relevant advertising, and the like.

One property with which a video can be labeled is the location that the video depicts, such as broad area like a city, a state, or a country, or a specific area like a particular school, a business, a park, or the like. The ability to accurately label a video with the location represented in the video (hereinafter also referred to simply as the video's location) would have numerous benefits for both users of the video hosting service and for the video hosting service itself.

However, automatic identification of the geographic location in a video is challenging, and conventional systems have thus far been confined to identifying locations of simpler types of media, such as images, that are less complex to analyze. Videos often have lower resolution than images, and are thus less able to be recognized using visual features alone. A further difficulty inherent in identifying the geographic locations of both videos and images is the visual similarity of different locations. For example, distinct urban areas, beaches, deserts, and the like tend to have very similar visual features which make them difficult to distinguish solely from their appearances.

SUMMARY

A classifier training system trains classifier functions (hereinafter simply "classifiers") for inferring the geographic locations of videos. A number of classifiers are provided, where each classifier corresponds to a particular location and is trained from a training set of videos that have been labeled as representing the location. The classifier training system derives, for each of these videos, features that characterize the video, such as audiovisual features, text features, address features, landmark features, and category features. Based on these features, the classifier training system trains a classifier function for the corresponding location.

The various types of video features may be obtained in different ways. For example, the audiovisual features and category features may be derived directly from the audiovisual content of the video, the textual features from textual metadata of the video, the address features from access log information associated with the videos in a video hosting service, and the landmark features from a combination of the audiovisual content and other types of content, such as web pages. Some features, such as category features and landmark features, may themselves be derived using separate classifiers, and the separate classifiers may have been previously trained on a variety of data sources, including data outside the video domain.

The various locations represent places at various levels of granularity, such as a state, a city, a portion of a city, or a park, building, or landmark, and so forth. The various locations may thus represent different amounts of physical area, from small areas (such as a specific building or park) to a large area (such as an entire country). The locations may be related hierarchically, with a city being located within a county, the county within a state, the state within a country, and the like. Additionally, the set of locations for which classifiers are learned may be specified manually by humans, or it may be determined automatically, such as by extracting location labels from videos that have been manually labeled by users that submitted them to the video hosting service.

Once trained, one or more classifiers can then be applied to an arbitrary video, producing as their output an indication (e.g., a Boolean value or a real number) that indicates whether, or how strongly, the video represents each of the locations corresponding to the classifiers.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
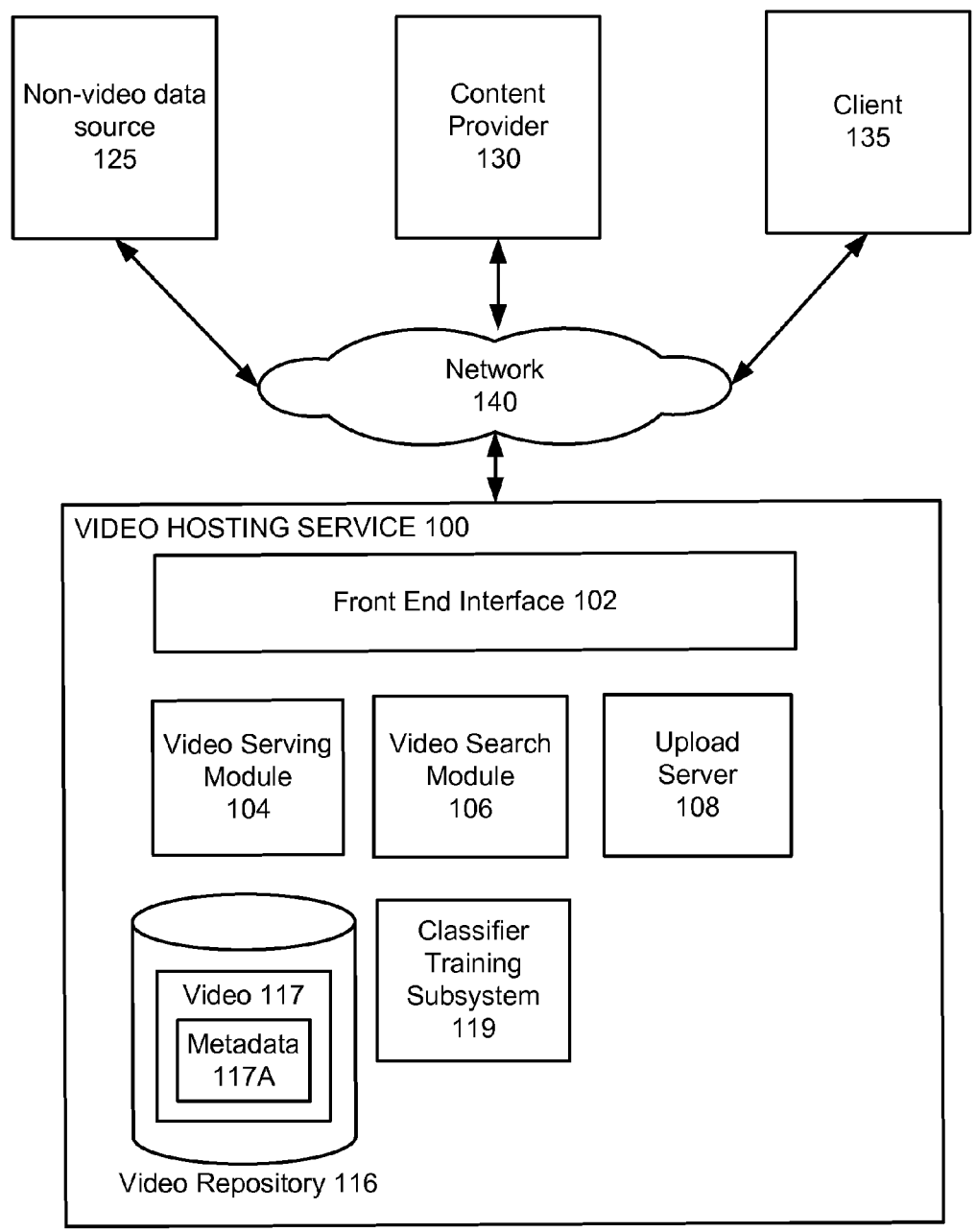
FIG. 1 is a block diagram of a video hosting service in which classifier training can be employed, according to one embodiment.

FIG. 1 is a block diagram of a video hosting service 100 in which location classifier training can be employed, according to one embodiment. The video hosting service 100 represents a system such as that of YOUTUBE™ that stores and provides videos to users via client devices 135. The video hosting service 100 communicates with a plurality of content providers 130 and client devices 135 via a network 140 to facilitate sharing of video content between users. The video hosting service 100 can additionally obtain data, such as web pages or other textual documents, photos, and the like, from various non-video data sources 125. The video data from the content providers 130, and (optionally) the data from the non-video data sources 125, serves as input data for classifier training performed by the video hosting service 100. Note that for the sake of clarity FIG. 1 depicts only one instance of non-video data source 125, content provider 130 and client device 135, though there could be any number of each.

Generally, a user of the content provider device 130 provides video content to the video hosting service 100 and a (usually different) user uses a client device 135 (also referred to simply as "client") to view that content. In practice, content provider devices 130 may also be used to view content. Additionally, a particular content provider device 130 may be operated by the same entity that operates the video hosting service 100.

The user of the content provider device 130 performs various content provider functions. Content provider functions may include, for example, uploading a video to the video hosting service 100, editing a video stored by the video hosting service 100, editing metadata information about a video, or editing content provider preferences associated with a video.

A client device 135 is a computing device that executes client software, e.g., a web browser or built-in client application, to connect to the video hosting service 100 via a network 140 and to display videos. The client device 135 might be, for example, a personal computer, a personal digital assistant, a cellular, mobile, or smart phone, a television "set-top box," or a laptop computer. In some embodiments, the client 135 includes an embedded video player such as, for example, the FLASH player from Adobe Systems, Inc. or any other player adapted for the video file formats used in the video hosting service 100.

Note that the terms "client" and "content provider" as used herein may refer to software providing client and content providing functionality, to hardware devices on which the software executes, or to the entities operating the software and/or hardware, as is apparent from the context in which the terms are used.

The non-video data source 125 comprises non-video data that is accessible to the video hosting service 100 via the network 140. For example, the non-video data source 125 may be a web server that provides web pages comprising textual HTML content. Alternatively and/or additionally, the non-video data source 125 may make available additional types of media content, such as digital photos or other image files, general textual documents, presentations, audio files, and the like.

The network 140 is typically the Internet, but may be any network, including but not limited to a LAN, a MAN, a WAN, a mobile wired or wireless network, a private network, or a virtual private network.

The video hosting service 100 operates on the video data from the content providers 130 (and, optionally, from the non-video data source 125) when training video classifiers. The video hosting service includes a front end interface 102, a video serving module 104, a video search module 106, an upload server 108, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE™ website, found at www.youtube.com. Other video hosting sites are known, as well, and can be adapted to operate according to the teachings disclosed herein.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 100, loaded into memory, and executed by the one or more processors of the service's computers. The foregoing further applies to components described herein as "servers."

The upload server 108 of the video hosting service 100 receives video content from a content provider 130. Received content is stored in the video repository 116. In response to requests from clients 135, a video serving module 104 provides video data from the video repository 116 to the clients. Clients 135 may also search for videos of interest stored in the video repository 116 using a video search module 106, such as by entering textual queries containing keywords of interest. The front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 further have associated metadata 117A, e.g., textual metadata such as a title, description, and/or tags provided by a content provider 130 who uploaded the video.

In one embodiment, the video hosting service 100 offers content providers 130 the opportunity to specify the location of a video at the time that they upload the video to the video hosting service. For instance, the video hosting service 100 can provide, as part of a video upload web page, a text field in which the content provider 130 can enter a text string describing the location, such as the city, state, and/or country. Alternatively and/or additionally, the video hosting service can provide, as part of the video upload web page, an electronic map on which the content provider 130 can click to specify the location as a latitude-longitude pair. The location is then stored as part of the metadata 117A.

The video hosting service 100 further comprises a classifier training subsystem 119 that trains an accurate video location classifier for each of some set of locations. The trained location classifier can then be applied to a given video to determine which of the known locations (if any) the video represents. The number of location classifiers can be specified by the system designer, based on (for example) the types of locations to be identified. An implementation to identify cities might have, for example, 500 classifiers, each corresponding to a particular city in the world. In one embodiment, the classifier training subsystem 119 is part of the video hosting service 100, as depicted in FIG. 1. In another embodiment, the classifier training subsystem 119 is separate from the video hosting service 100, receiving input from it and providing output to it. The classifier training subsystem 119 is described in greater detail in FIG. 3.

The video hosting service 100 may be implemented using a single computer, or a network of computers, including cloud-based computer implementations. The computers are preferably server class computers including one or more high-performance CPUs and 1G or more of main memory, as well as 500 Gb to 2Tb of computer readable, persistent storage, and running an operating system such as LINUX or variants thereof. The operations of the service 100 as described herein can be controlled through either hardware or through computer programs installed in computer storage and executed by the processors of such servers to perform the functions described herein. The service 100 includes other hardware elements necessary for the operations described here, including network interfaces and protocols, input devices for data entry, and output devices for display, printing, or other presentations of data.

Figure 2:
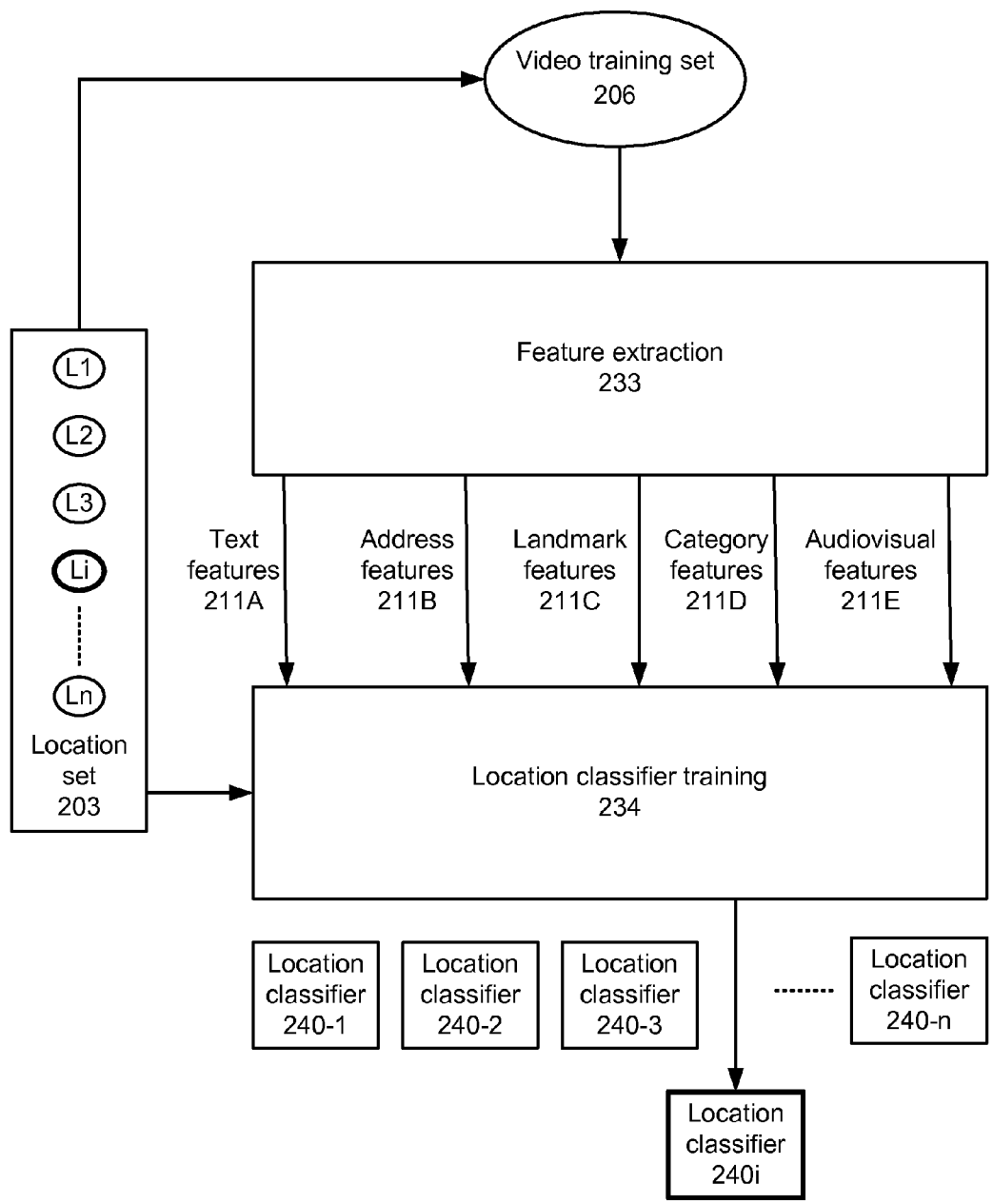
FIG. 2 is a data flow diagram illustrating the training of an individual location classifier, according to one embodiment.

FIG. 2 is a data flow diagram illustrating at a high level the training of an individual location classifier by the classifier training subsystem 119, according to one embodiment. For a given location $L_i$, selected from a set of locations 203, a video training set 206 is selected, the training set comprising videos labeled as representing that location.

From each video in the training set 206, a feature extraction module 233 derives a set of features 211—collectively known as a feature vector—that is representative of the video. In one embodiment, the features 211 include not only audiovisual features 211E of the video content itself, but also textual features 211A derived from video metadata, address features 211B, landmark features 211C indicating the presence of known landmarks, and category features 211D indicating semantic categories (e.g., "Arts & Entertainment" or "Sports") that the videos represent. It is understood that the exact types of features may vary in different embodiments, with fewer and/or other features being used.

The feature vector 211 for each video in the video training set 206 is provided to a location classifier training module 234, which analyzes the data from the set of feature vectors and trains a location classifier $240_i$, corresponding to the location $L_i$, that takes as input a feature vector for an arbitrary video and produces as output an indication of whether, or how strongly, the video represents the location $L_i$.

Figure 3:
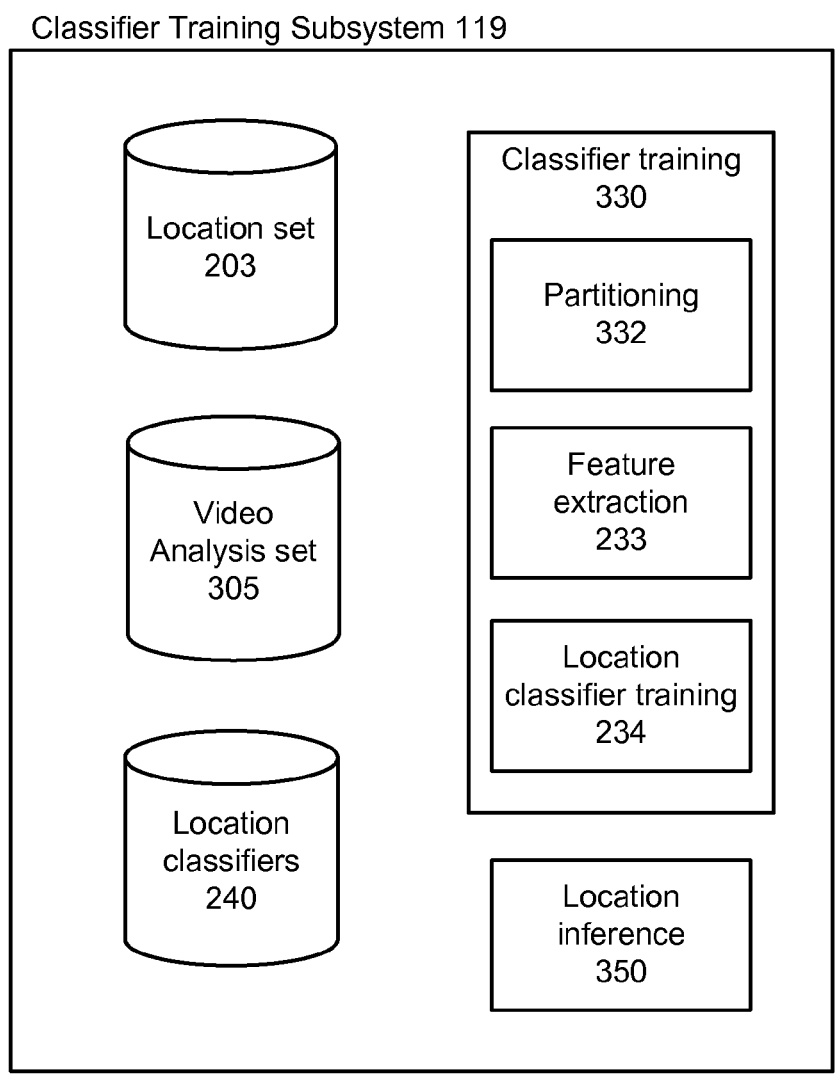
FIG. 3 illustrates the various components of a classifier training subsystem used to perform the training of FIG. 2, according to one embodiment.

FIG. 3 illustrates the various component's of the classifier training subsystem 119 used to perform the training of FIG. 2, according to one embodiment.

The classifier training subsystem 119 comprises a video analysis set 305 that represents some subset of the videos 117 of the video repository 116 for which location labels have been specified. As previously noted, in one embodiment the video hosting service 100 offers content providers 130 the opportunity to specify the location of a video at the time that they upload the video to the video hosting service. In one embodiment, only a subset of the videos 117 with location labels are placed in the analysis set 305. The videos of the analysis set 305, along with their specified location labels, are then used to train and validate location classifiers 240 for the various categories with which the videos are associated.

The classifier training subsystem 119 comprises a set of locations 203 representing places—such as a particular landmark, building, park, a city, or a state—for which a classifier can be trained. The locations 203 may have hierarchical relationships, with a city being located within a state, a state within a country, and the like.

A location, when applied to a video as a label, can be represented in various manners as would be appreciated by one of skill in the art, such as a textual name of the location (e.g., the string "Santa Clara, Calif., USA"), a unique shorthand numerical identifier (e.g., 1) mapping to a database storing information on the locations, or a latitude/longitude coordinate pair. A video can be said to represent a location if the video contains some images of what an observer would see at that location. A video typically represents at most one of the locations 203, although in some embodiments it may represent multiple locations, such in the case of as a location representing a particular landmark and another location representing the city in which the landmark is located, or of a single video depicting multiple distinct locations.

Additionally, the set of locations 203 may be specified manually by humans, or it may be determined automatically. As an example of manual specification of the locations 203, human experts can construct a hierarchy, such as a hierarchy of political boundary types including (in increasing order of generality), a locality (e.g., a city), an administrative subdivision (e.g., a county), an administrative division (e.g., a state), and a country. An ordered set of such locations in turn represents a location; for example, "USA [country]" is a location representing a country, and "California [state]"→"USA [country]" is a location unambiguously representing a state by additionally specifying the country to which the state belongs. In such an embodiment, the location label provided by the user, such as a string or coordinate pair, can be automatically mapped to the appropriate ordered set of locations. For example, the user-entered location label "San Jose" might be mapped to "San Jose [city]"→"Santa Clara [county]"→"California [state]"→"USA [country]", and "CA" might be mapped to "California [state]"→"USA [country]". The mapping may include the examination of additional information in order to improve mapping accuracy, such as noting that a user profile of a user that marked a video "San Jose" states that that user resides in San Jose, Calif., United States, and that a political boundary database states that San Jose is located within Santa Clara county. Other sets of location types can be used as well, such types including buildings, landmarks, points of interest, natural features (e.g., bodies of water, parks, etc.), and so forth. In general, any physical area may be represented as a location and may be placed in the hierarchy. For example, the Eiffel Tower landmark might be represented as "Tour Eiffel [landmark]"→"Champs de Mars [neighborhood]"→"Paris [city] "→"Ile de France [county]"→"France [country]".

As an example of automatic determination of the location set 203, the video hosting service 100 can enable content providers 130 to specify the location of a video at the time that they upload the video to the video hosting service, the specified location being added to the video metadata. The classifier training subsystem 119 identifies a set of videos 117 for which a location has been specified, such as all videos viewed during the prior week. The classifier training subsystem 119 can then form the set of locations 203 as the union of all unique locations, or of all unique locations that have been specified for some minimum number of videos.

The various videos of the training set 206 need not be equally distributed amongst the various locations of the location set 203. Rather, different locations 203 may have different numbers of corresponding videos. In one embodiment, locations lacking some threshold number of videos—e.g., at least 500—are discarded for purposes of future classifier training. Thus, for example, although the location set 203 might originally have 10,000 distinct locations, only some smaller number of locations (e.g., 3,000) might have a sufficient number of associated videos to be included in the classifier training.

The classifier training subsystem 119 further comprises location classifiers 240. Specifically, the location classifiers 240 are trained using the videos of the training set 206. Each location classifier 240 is associated with one of the locations in the location set 203 and, when applied to a video—or, more specifically, to the feature vector of the video—provides a measure of how strongly the video represents that location. In one embodiment, a location classifier 240 produces a Boolean score representing whether or not a given video represents the location corresponding to the classifier; in another embodiment, a classifier produces a real number (e.g., ranging from 0.0 to 1.0), integer, or other scalar value representing how strongly (e.g., a measure of likelihood or probability) the video represents the location, and numbers greater than some threshold can be considered to indicate that the video represents the category. (The phrase "how strongly" is used hereinafter to include not only real numbers, integers, and the like indicating an extent to which a video represents a location, but also Boolean values indicating whether the video represents the location.)

The classifier training subsystem 119 further comprises a classifier training module 330 that analyzes the videos in the analysis set 305 and trains the location classifiers 240. Specifically, the classifier training module 330 comprises a partitioning module 332 that partitions the videos of the analysis set 305 into training sets 206 and validation sets, and that further partitions both the training and validation sets into positive and negative training subsets based on the location labels of the videos in the training set. In one embodiment, the partitioning module 332 randomly selects fifteen percent of videos in the analysis set 305 to use as the validation set, and uses the remaining 85% of the videos as the training set 206. Then, for each location in the location set 203, the partitioning module 332 partitions the training set 206 into some positive subset of videos representing the location and some negative subset of items not representing the location. In an embodiment in which the location set 203 is structured hierarchically, the videos representing a location are defined to be those with the location within the hierarchy of their location labels. For example, the positive training subset of videos for the location corresponding to Santa Clara country would include videos with location labels corresponding to a city within the county (e.g., "San Jose [city]"→"Santa Clara [county]"→"California [state]"→"USA [country]"), as well as those with location labels for the county as a whole (e.g., "Santa Clara [county]"→"California [state]"→"USA [country]"). The negative training subset for a location can be formed in different ways in different embodiments, such as by choosing videos at random, or by choosing any videos not in the positive training subset for that location, or by more specifically choosing other locations at the same level of the hierarchy, such as (for a city location) other cities in the same state, or (for an American state) other American states.

Thus, referring to the above location examples, the partitioning module 332 could partition the analysis set 305 into a positive subset of videos representing the location Santa Clara, Calif., and a negative subset of videos not representing Santa Clara, a positive subset representing Mountain View, Calif. and a negative subset not representing Mountain View, and so forth, for each location in the location set 203. These subsets can then be used by a location classifier training module 234 to train and validate the location classifiers 240 for the locations of Santa Clara and Mountain View.

The classifier training module 330 further comprises a feature extraction module 233 that derives relevant features from the various videos in the analysis set 305, and a location classifier training module 234 that trains classifiers for the various locations 203 using the features derived by the feature extraction module 233. These modules are now described in further detail.

The feature extraction module 233 derives features from the videos of the analysis set 305, the features serving as descriptive representations of their respective videos for use in training the location classifiers 240. In one embodiment, the following features are derived:

Audiovisual features: A number of distinct types of features are extracted from the audiovisual content of the video itself, including:
A histogram of local features sampled at sparse interest points using a Laplacian-of-Gaussian (LoG) or Scale Invariant Feature Transform (SIFT) feature extractor, with local descriptors being computed using Gabor wavelet responses at different orientations, spatial scales, and spatial offsets;
A color histogram computed using hue and saturation in HSV color space;
Motion rigidity features;
Pornography detection features based on a boosting-based classifier in addition to frame-based pornography detection features;
Audio features such as Stabilized Auditory Image (SAI) features and audio spectrogram;
Color motion defined as the cosine distance of color histograms between two consecutive frames;
Skin color features;
Edge features using edges detected by a Canny edge detector in regions of interest;
Line features using lines detected by a probabilistic Hough Transform;
A histogram of textons;
Entropy features for each frame using a normalized intensity histogram and entropy differences for multiple frames;
Facial features such as a number of faces, or the size and aspect ratio of largest face region, with faces being detected by an extension of the AdaBoost classifier; and
Shot boundary detection based features using differences of color histograms from consecutive frames.

Textual features: The feature extraction module 233 derives textual features from metadata of the videos in the analysis set 305. In one embodiment, the feature extraction module 233 infers likely clusters of words for the given textual metadata using Noisy-Or Bayesian networks. (For more details, see, for example, *Learning Bayesian Networks* by R. E. Neapolitan, Prentice Hall, 2003, which is hereby incorporated by reference.) Then, a taxonomic classifier (a linear support vector machine) is used to map the cluster activations to a predefined set of categories, such as "Sports & Fitness" or "Travel & Tourism". Thus, the output is a vector of scores representing how well the video represents the various categories based on the video's textual metadata.

Address features: The feature extraction module 233 also derives features related to the address used for uploading, or the address of the content provider 130. One relevant form of information derivable from the address is the physical location of the content provider 130 at the time that it uploads a video to the video hosting service 100. Although physical location at the time of uploading is not necessarily the same location as that represented in the video, such is often the case. Additionally, even if the physical location of uploading is not the same location depicted in the video, knowing the former may help to determine the latter. For example, it might be the case that videos taken in Paris are sometimes uploaded in London, and this pattern can be learned from the address features.

In one embodiment, as a proxy for knowing the geographic location, the feature extraction module 233 derives both (a) the zip code and country of residence of a user or other content provider 130 uploading the video, as specified in the user's profile, and (b) the internet protocol (IP) or other network address of the computing device used to upload the video. In some embodiments, IP addresses of other users interacting with the video may also be used, such as IP addresses of viewers, commenters, those who select the video as a favorite, and the like. In one embodiment, the IP address(es) are then mapped to a specific location or location hierarchy using existing directories. For example, a particular IP address might be mapped to "Paris [city]"→"France [country]", with the value at each level of the hierarchy being used as a feature (e.g., "Paris" for the city level, and "France" for the country level). The zip code and the values at each level in the hierarchy then serve as the address features for the video. Features such as the zip code are often entirely missing, but the training process accounts for such missing information.

Landmark features: The presence of distinctive landmarks can serve as a useful indication of the location. For example, the presence of the Eiffel Tower is a strong indication that the video location is Paris, France. To determine which landmarks are present in the video, a landmark classifier is first trained for each of a number of distinct landmarks using a combination of images tagged with geographic coordinates (e.g., GPS coordinates) and web pages from travel sites or other sites from which landmark names can be extracted. Each landmark classifier is associated with geographic coordinates corresponding to the landmark location. The feature extraction module 233 then applies each of these landmark classifiers to a video, resulting in a set of landmark scores, each score representing how strongly the associated landmark is present in the video. Additional details on the training and use of landmark classifiers are provided in Zheng, et. al, "Tour the World: Building a Web-Scale Landmark Recognition Engine", *Proceedings of International Conference on Computer Vision and Pattern Recognition*, Miami, Fla., U.S.A: (June, 2009), which is incorporated by reference herein.

Category features: The general category or genre of a video can also serve as useful information for determining the location of a video. For example, if it were known that a given video represented a category such as "Travel→Nature", and not other categories such as "Sports", this would tend to indicate a greater likelihood that the video represents a location corresponding to a national park.

Thus, a category discovery system is used to train classifiers representing various concepts, such as "Travel→Nature" and "Sports." In one embodiment, the category discovery system extracts phrases from textual metadata of videos and treats them as potential categories, then forms training and validation sets for each potential category based on the presence of the corresponding phrase in video metadata. Then, the category discovery system iteratively trains classifiers for each potential concept on videos of the training set 206, retaining those that are determined to be sufficiently accurate when used with the validation set and appending the scores from those classifiers as additional features to the videos in the training and validation sets. Based on this additional feature information, accurate classifiers can be trained for new categories at each iteration, the end result being a set of accurate classifiers for some corresponding set of learned categories.

The feature extraction module 233 then applies each of these category classifiers to a video, resulting in a set of category scores, each score representing how strongly the associated category is represented by the video.

The combination of the various features extracted from a particular video—e.g., concatenated in a specific order—serves as a feature vector that characterizes the video. The feature vectors for the videos of the training set and the validation set for a given video location are then used to train a location classifier for that location and to validate the classifier's accuracy, as now further described.

The classifier training subsystem 119 further comprises a location classifier training module 234 that trains the various location classifiers 240 for each location in the location set 203. More specifically, for each analyzed location of the location set 203, the location classifier training module 234 provides the feature vector extracted by the feature extraction module 233 from the positive and negative training subsets produced by the partitioning module 332 as input to a training algorithm, which trains the corresponding location classifier 240 for the location. In one embodiment, the training algorithm is AdaBoost, the details of which are known to one having ordinary skill in the art. In other embodiments, other training algorithms such as linear support vector machine (SVM) are used.

The location classifier training module 234 further quantifies the accuracy of the location classifiers 240 by applying each location classifier to the validation set. In one embodiment, each location classifier 240 is applied to each video in the validation set (or some smaller subset thereof), and the output of the location classifier is compared to the location label of the video to determine whether the location classifier's prediction was accurate. Specifically, if the output produced by the classifier is not already Boolean—directly indicating whether or not the video represents the location—it may be mapped to a Boolean value. For example, in embodiments in which the classifiers 240 produce real number scores indicating a degree of match strength, the real numbers can be compared to some predetermined threshold, such as 0.94 on a scale of 0.0 to 1.0, to determine whether the similarity is sufficiently strong to constitute a match, with numbers greater than the threshold indicating a match, and lesser numbers indicating a failure to match. If the classifier produces output indicating that a video represents the location, and the video is in fact already labeled with that location, the classification is considered a true positive classification (TP). Similarly, classifier output indicating that a video lacking the location label does in fact represent the location is considered a false positive (FP), output indicating that a video having the location label does not represent the location is considered a false negative (FN), and output indicating that a video lacking the location label does not represent the location is considered a true negative (TN). An overall accuracy can then be determined for the location classifier, with classifiers lacking sufficient accuracy being discarded. In one embodiment, the accuracy is considered sufficient only if the precision and recall of the classifier are both above predetermined values, such as 0.7, where the precision P is defined as $P=TP/(TP+FP)$, and the recall R is defined as $R=TP/(TP+FN)$. In another embodiment, the accuracy is considered sufficient only if an F-score is above some predetermined threshold (e.g., 0.7), where the F-score F is defined as a function of the precision and recall, $F=2PR/(P+R)$.

The classifier training subsystem 119 optionally further comprises a location inference module 350 that applies the location classifiers 240 produced by the classifier training module 330 to determine locations of the location set 203 that are applicable to a given video. Discussion of the use of the location inference module 350 is provided below, although it is appreciated that the possible uses of the assigned category label are numerous and are not limited to the specific examples provided.

It is appreciated that the above-presented description of the operation of the classifier training subsystem 119 represents one embodiment, and that other variations are likewise possible. For example, in an alternate embodiment the analysis set 305 is limited to a subset of the videos 117 having location labels—namely, those videos that have location labels and that additionally have some other known property of interest, such as depicting a landmark that matches the location label. More specifically, the positive subsets contain those videos with location labels matching a depicted landmark, and the negative subsets contain random videos for which no landmarks were detected. The remainder of the above-described methodology remains unchanged. In this alternate embodiment, the presence or absence of a given landmark can be determined by applying the landmark classifiers described above with respect to the feature extraction module 233 of FIG. 3. Then, the geographic coordinates (e.g., GPS coordinates) are mapped to a location name hierarchy, and the classifier training subsystem 119 determines whether the location label matches the hierarchy, or one name thereof. For example, if the landmark "Eiffel Tower" were detected in a video tagged "Paris", its associated GPS coordinate might be mapped to the location name hierarchy "Paris [city]"→"Ile de France [county]"→"France [country]", and a match would thus be found for the city name of the location hierarchy. The trained classifiers thus are able to determine if a video represents a given location and shows features—e.g., buildings, landscapes, and vehicles—that are similar to the landmarks known to be present at that location. Such classifiers are effective for identifying videos that are representative of an area—i.e., have expected landmarks—and thus are relevant for tourism purposes, for example.

Uses of the Trained Classifiers

After the training process is complete, the location classifiers 240 can, when applied to a video (e.g., by the location inference module 350), produce a score for every location of the set of locations 203. The location classifiers 240 may then be applied to categorize videos 117 from the video repository 116 that do not already have location labels. Specifically, the location classifiers 240 are provided, as input, with the same type of information that was used to train them—that is, the feature vectors as described above. Thus, for each location 203, the location classifiers 240 are applied to a video for which the location is not yet known, producing a set of location scores (one from each classifier 240), each location score representing how strongly the input video represents the corresponding location of the classifier 240. The set of location scores can be considered a location score vector and may be used in a number of different ways, both by the video sharing system 100 itself and also by other systems, as now described in more detail.

Metadata augmentation: A location score indicating that the video represents the corresponding location can be used to augment the metadata already associated with the video by including in the metadata a label (or set of labels) corresponding to the location. For example, when a user or other content provider 130 uploads a video to the video hosting service 100, the service can suggest to the user that the video likely represents a given location(s) and prompt the user to confirm adding a textual description of the location (e.g., "San Jose, Calif., U.S.", or "San Jose") as a metadata tag. Alternatively, the video hosting service 100 might automatically add the tag, both to videos currently being uploaded to the video hosting service and to those videos 117 already stored within the video repository 116.

Video search: The textual descriptions of the location added to the metadata can further be used to improve search for videos. Video search systems typically rely on indexing of keywords or phrases in the video metadata, but for many videos the metadata tends to be sparse, thus providing the search systems with little information and consequently causing the video to be omitted from the search results. The augmentation of the metadata with textual descriptions of the locations represented by the videos thus provides additional information for returning relevant videos in response to a user query, particularly where the query terms comprise a location name.

Advertisement selection: When a user of the video hosting service 100 is viewing a particular video, it would be beneficial to display an advertisement that the user is likely to view. The probability of selecting such an advertisement is increased when the advertisement can be properly paired with the subject matter of the video. To this end, the video hosting service 100 can apply the location classifiers 240 and thereby determine which location(s) (if any) the video represents. Based on the known locations, the video hosting service 100 can then select an advertisement associated with that location, such as hotels near that location, flights to that location, and the like.

Visual map systems: The ability to identify a location of a video enhances the ability of visual map systems to provide associated information. For example, a map system such as GOOGLE MAPS can query for videos having a location corresponding to the various parts of the map and then can display visual indications of the videos at an appropriate location on the map, which the user can click on or otherwise select to view the videos. The videos to display can be selected based on a combination of factors, such as (in the case of the location classifiers outputting real-numbered values) how strongly the video represents the location in question, and the aggregate popularity of the video. Thus, for example, users can easily select videos associated with locations of interest, such as travelogues, movies filmed at that location, and the like.

In the embodiment in which the analysis set 305 is limited to a subset of the videos 117 having location labels that match a landmark depicted within the videos, the scores from the resulting classifiers represent the geographic relevance of videos. These geographic relevance scores can be used for ranking videos within a video search result set, for selecting geographically relevant targeted ads, and for determining how prominently to display a video on an electronic map, for example.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for training video location classifiers, the method comprising:
   storing a set of locations, each location uniquely corresponding to a geographic area having a unique geographic placement;
   providing a user interface for uploading a video, the user interface comprising a user interface element for specifying locations from the stored set of locations;
   receiving, from users via the user interface, a set of uploaded videos, each uploaded video labeled with a location from the stored set of locations, the location specified using the user interface;
   selecting, for each of a plurality of the locations, a location training set comprising ones of the uploaded videos that are labeled with the location;
   for each of a plurality of video location classifiers, each video location classifier associated with one of the locations:
      for each uploaded video of the location training set for the associated location, deriving a set of features associated with the uploaded video, the set of features comprising:
         audiovisual features extracted from content of the uploaded video;
         upload location information derived from an internet protocol (IP) address from which the uploaded video was uploaded;
         landmark scores indicating whether the uploaded video contains landmark features, the landmark scores being produced by applying trained landmark classifiers to the uploaded video;
         category scores indicating whether the uploaded video represents predetermined categories, the category scores produced by category classifiers that are trained based at least in part on a set of videos considered to represent the categories; and
         textual features derived from metadata of the uploaded video;
      training the video location classifier based at least in part on the features derived from the uploaded videos in the location training set;
   for an unlabeled video not labeled with a location from the stored set of locations, and for a first one of the trained video location classifiers:
      deriving a set of features comprising audiovisual features extracted from content of the unlabeled video, upload location information derived from the IP address from which the video was uploaded, landmark scores indicating whether the unlabeled video contains landmark features, category scores indicating whether the unlabeled video represents predetermined categories, and textual features derived from metadata of the unlabeled video;
      applying the first one of the trained video location classifiers to the set of features derived for the unlabeled video, thereby producing a location score indicating how strongly the unlabeled video represents the location associated with the first one of the trained video location classifiers;
      predicting based on the location score, that the unlabeled video represents the location associated with the first one of the trained video location classifiers; and
      providing, to a user, a visual representation of a map, the map including a visual indication of the unlabeled video on a portion of the map corresponding to the location associated with the first one of the trained video location classifiers.

2. The computer-implemented method of claim 1, wherein the user interface element comprises an electronic map, such that clicking on a portion of the electronic map specifies, as the location of the uploaded video, coordinates corresponding to the portion.

3. The computer-implemented method of claim 1, wherein the user interface element comprises a text area for specifying the location of the uploaded video via a text string describing the location.

4. The computer-implemented method of claim 1, further comprising identifying a set of unique locations specified via the user interface element for specifying a location and storing the identified set of unique locations as the stored set of locations.

5. The computer-implemented method of claim 1, wherein the stored set of locations comprises a manually specified, hierarchically arranged set of locations.

6. The computer-implemented method of claim 1, further comprising:
responsive to predicting that the unlabeled video represents the location, prompting a user with a recommendation to label the unlabeled video with the location.

7. The computer-implemented method of claim 1, further comprising:
responsive to predicting that the unlabeled video represents the location, adding a label corresponding to the location to metadata of the unlabeled video.

8. The computer-implemented method of claim 1, further comprising:
receiving a query from a user for videos, the query comprising text associated with the location;
responsive to determining that the unlabeled video represents the location associated with the first one of the video location classifiers, adding the video to a query result set; and
providing the query result set to the user.

9. The computer-implemented method of claim 1, further comprising:
receiving from a user a request to view the unlabeled video; and
responsive to determining that the unlabeled video represents the location associated with the first one of the video location classifiers:
selecting an advertisement associated with the location;
providing the unlabeled video and the advertisement to the user.

10. The computer-implemented method of claim 1, further comprising limiting the location training set by:
detecting a landmark in a video;
identifying a location corresponding to the detected landmark; and
excluding the video from the location training set responsive to the location corresponding to the detected landmark differing from the location which the video is labeled as representing.

11. A computer-usable non-transitory medium having executable computer program instructions embodied therein for training video location classifiers, actions of the computer program instructions comprising:
storing a set of locations, each location uniquely corresponding to a geographic area having a unique geographic placement;
providing a user interface for uploading a video, the user interface comprising a user interface element for specifying locations from the stored set of locations;
receiving, from users via the user interface, a set of uploaded videos, each uploaded video labeled with a location from the stored set of locations, the location specified using the user interface;
selecting, for each of a plurality of the locations, a location training set comprising ones of the uploaded videos that are labeled with the location;
for each of a plurality of video location classifiers, each video location classifier associated with one of the locations:
for each uploaded video of the location training set for the associated location, deriving a set of features associated with the uploaded video, the set of features comprising:
audiovisual features extracted from content of the uploaded video;
upload location information derived from an internet protocol (IP) address from which the uploaded video was uploaded;
landmark scores indicating whether the uploaded video contains landmark features, the landmark scores being produced by applying trained landmark classifiers to the uploaded video;
category scores indicating whether the uploaded video represents predetermined categories, the category scores produced by category classifiers that are trained based at least in part on a set of videos considered to represent the categories; and
textual features derived from metadata of the uploaded video;
training the video location classifier based at least in part on the features derived from the uploaded videos in the location training set;
for an unlabeled video not labeled with a location from the stored set of locations, and for a first one of the trained video location classifiers:
deriving a set of features comprising audiovisual features extracted from content of the unlabeled video, upload location information derived from the IP address from which the video was uploaded, landmark scores indicating whether the unlabeled video contains landmark features, category scores indicating whether the unlabeled video represents predetermined categories, and textual features derived from metadata of the unlabeled video;
applying the first one of the trained video location classifiers to the set of features derived for the unlabeled video, thereby producing a location score indicating how strongly the unlabeled video represents the location associated with the first one of the trained video location classifiers;
predicting based on the location score, that the unlabeled video represents the location associated with the first one of the trained video location classifiers; and
providing, to a user, a visual representation of a map, the map including a visual indication of the unlabeled video on a portion of the map corresponding to the location associated with the first one of the trained video location classifiers.

12. The computer-usable non-transitory medium of claim 11, wherein the user interface element comprises an electronic map, such that clicking on a portion of the electronic map specifies, as the location of the uploaded video, coordinates corresponding to the portion.

13. A computer system for training video location classifiers, the system comprising:
a computer processor; and
a computer-readable storage medium storing data comprising:
a set of locations, each location uniquely corresponding to a geographic area having a unique geographic placement,
a set of uploaded videos labeled as representing one or more of the locations, and
a computer program executable by the computer processor and performing actions comprising:
providing a user interface for uploading a video, the user interface comprising a user interface element for specifying locations from the stored set of locations;
receiving, from users via the user interface, a set of uploaded videos, each uploaded video labeled with a location from the stored set of locations, the location specified using the user interface;
storing the set of uploaded videos;
selecting, for each of a plurality of the locations, a location training set comprising ones of the uploaded videos that are labeled with the location;
for each of a plurality of video location classifiers, each video location classifier associated with one of the locations:
for each uploaded video of the location training set for the associated location, deriving a set of features associated with the uploaded video, the set of features comprising:
audiovisual features extracted from content of the uploaded video;
upload location information derived from an internet protocol (IP) address from which the uploaded video was uploaded;
landmark scores indicating whether the uploaded video contains landmark features, the landmark scores being produced by applying trained landmark classifiers to the uploaded video;
category scores indicating whether the uploaded video represents predetermined categories, the category scores produced by category classifiers that are trained based at least in part on a set of videos considered to represent the categories; and
textual features derived from metadata of the uploaded video;
generating the video location classifier based at least in part on the features derived from the uploaded videos in the location training set
for an unlabeled video not labeled with a location from the stored set of locations, and for a first one of the trained video location classifiers:
deriving a set of features comprising audiovisual features extracted from content of the unlabeled video, upload location information derived from the IP address from which the video was uploaded, landmark scores indicating whether the unlabeled video contains landmark features, category scores indicating whether the unlabeled video represents predetermined categories, and textual features derived from metadata of the unlabeled video;
applying the first one of the trained video location classifiers to the set of features derived for the unlabeled video, thereby producing a location score indicating how strongly the unlabeled video represents the location associated with the first one of the trained video location classifiers;
predicting based on the location score, that the unlabeled video represents the location associated with the first one of the trained video location classifiers; and
providing, to a user, a visual representation of a map, the map including a visual indication of the unlabeled video on a portion of the map corresponding to the location associated with the first one of the trained video location classifiers.

14. The computer-usable non-transitory medium of claim 11, wherein the user interface element comprises a text area for specifying the location of the uploaded video via a text string describing the location.

15. The computer-usable non-transitory medium of claim 11, the actions further comprising identifying a set of unique locations specified via the user interface element for specifying a location and storing the identified set of unique locations as the stored set of locations.

16. The computer-usable non-transitory medium of claim 11, wherein the stored set of locations comprises a manually specified, hierarchically arranged set of locations.

17. The computer-usable non-transitory medium of claim 11, the actions further comprising:
responsive to predicting that the unlabeled video represents the location, prompting a user with a recommendation to label the unlabeled video with the location.

18. The computer-usable non-transitory medium of claim 11, the actions further comprising:
responsive to predicting that the unlabeled video represents the location, adding a label corresponding to the location to metadata of the unlabeled video.

19. The computer-usable non-transitory medium of claim 11, the actions further comprising:
receiving a query from a user for videos, the query comprising text associated with the location;
responsive to determining that the unlabeled video represents the location associated with the first one of the video location classifiers, adding the video to a query result set; and
providing the query result set to the user.

20. The computer-usable non-transitory medium of claim 11, the actions further comprising:
receiving from a user a request to view the unlabeled video; and
responsive to determining that the unlabeled video represents the location associated with the first one of the video location classifiers:
selecting an advertisement associated with the location;
providing the unlabeled video and the advertisement to the user.

* * * * *